United States Patent
Han et al.

(10) Patent No.: US 11,635,348 B2
(45) Date of Patent: Apr. 25, 2023

(54) SYSTEM AND METHOD FOR DETECTING DAMAGE TO BEARING OF ENGINE USING KNOCKING SENSOR

(71) Applicants: Hyundai Motor Company, Seoul (KR); Kia Corporation, Seoul (KR)

(72) Inventors: Jung-Suk Han, Gyeonggi-Do (KR); Chang-Jin Oh, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/534,781

(22) Filed: Nov. 24, 2021

(65) Prior Publication Data

US 2022/0244140 A1 Aug. 4, 2022

(30) Foreign Application Priority Data

Feb. 3, 2021 (KR) .................. 10-2021-0015600

(51) Int. Cl.
| | |
|---|---|
| G01M 13/00 | (2019.01) |
| G01M 13/045 | (2019.01) |
| F02D 31/00 | (2006.01) |
| G01M 15/12 | (2006.01) |

(52) U.S. Cl.
CPC ......... *G01M 13/045* (2013.01); *F02D 31/007* (2013.01); *G01M 15/12* (2013.01)

(58) Field of Classification Search
CPC .................................................. F02D 35/027
See application file for complete search history.

(56) References Cited

U.S. PATENT DOCUMENTS

| | | | |
|---|---|---|---|
| 10,564,070 B1* | 2/2020 | Im | G01M 15/12 |
| 2008/0133177 A1* | 6/2008 | Klenk | F02D 41/22 |
| | | | 702/183 |

(Continued)

FOREIGN PATENT DOCUMENTS

KR 10-2010-0062421 A 6/2010

OTHER PUBLICATIONS

European Search Report from EP Application No. 21210783 dated Apr. 21, 2022, 10 pages.

*Primary Examiner* — Phutthiwat Wongwian
*Assistant Examiner* — Sherman D Manley
(74) *Attorney, Agent, or Firm* — Fox Rothschild LLP (57) ABSTRACT

A method for detecting damage to a bearing of an engine using a knocking sensor includes a data storing step, which stores a vibration signal output from the knocking sensor in a data storing unit, a by-frequency amplitude calculating step, which performs Fast Fourier Transform (FFT) for the vibration signal and calculates an amplitude for each frequency, a detection frequency integrating step, which obtains a detection frequency integration value by adding all amplitudes of detection frequencies, a noise determining step, which determines whether the vibration signal is the vibration signal irrelevant to damage to the bearing by determining whether exclusion frequencies correspond to a preset condition, a counter increasing step, which increases a damage counter, when the detection frequency integration value is greater than a preset damage threshold, and a damage confirming step, which confirms damage to the bearing, when the damage counter equals or exceeds a preset confirmation counter.

25 Claims, 8 Drawing Sheets

(56) References Cited

U.S. PATENT DOCUMENTS

| | | | |
|---|---|---|---|
| 2016/0195029 A1* | 7/2016 | Bizub | F02D 41/22 |
| | | | 73/35.03 |
| 2016/0258378 A1* | 9/2016 | Bizub | F02D 41/2441 |
| 2016/0312716 A1* | 10/2016 | Bizub | G01L 23/221 |
| 2017/0184047 A1* | 6/2017 | Shirahashi | F02D 41/3035 |
| 2019/0112952 A1 | 4/2019 | Bong | |
| 2019/0226416 A1* | 7/2019 | Zurlo | F02D 41/2422 |
| 2020/0063668 A1* | 2/2020 | Jeong | F02D 35/027 |

* cited by examiner

SYSTEM AND METHOD FOR DETECTING DAMAGE TO BEARING OF ENGINE USING KNOCKING SENSOR

CROSS-REFERENCE TO RELATED APPLICATION

This application claims under 35 U.S.C. § 119(a) the benefit of Korean Patent Application No. 10-2021-0015600, filed on Feb. 3, 2021, the entire contents of which are incorporated herein by reference.

BACKGROUND

(a) Technical Field

The present disclosure relates to a system and a method for detecting damage to a bearing using a vibration signal input to a knocking sensor attached to an engine, more particularly, to the system and method for detecting damage to the bearing of the engine, which may prevent false detection by comparing a vibration signal in other frequency bands as well as in a frequency band detecting damage to the bearing, thereby enhancing accuracy.

(b) Description of the Related Art

In an engine, a portion thereof in which a crankshaft is connected to a cylinder block and a connecting rod is mounted with a bearing for reducing friction. The engine is operated by control of an engine control unit (ECU) to generate power necessary for operating a vehicle.

The engine generates noise and vibration due to combustion in a normal condition, but generates noise and vibration different from the noise and vibration due to the combustion when an abnormality occurs in a component of the engine.

For example, if the bearing is damaged, the engine generates noise and vibration different from those of a normal engine.

Further, if the bearing is damaged, a serious problem such as sticking may occur in the engine.

To detect damage to the bearing, the damage is detected by monitoring a magnitude of vibration in a specific frequency band when the bearing is damaged using a band-pass filter. When the bearing is damaged, a vibration component in a bearing damage frequency band, which is the band of about 2 kHz to 5 kHz is strong when the engine is operated, such that the damage to the bearing is detected by monitoring a vibration signal in the band.

However, since the related art monitors only the vibration signal in the bearing damage frequency band, there is a problem in that the bearing is detected as being damaged even if vibration signals in the entire frequency band are increased together by a strong knocking or the like.

Figure 3A:
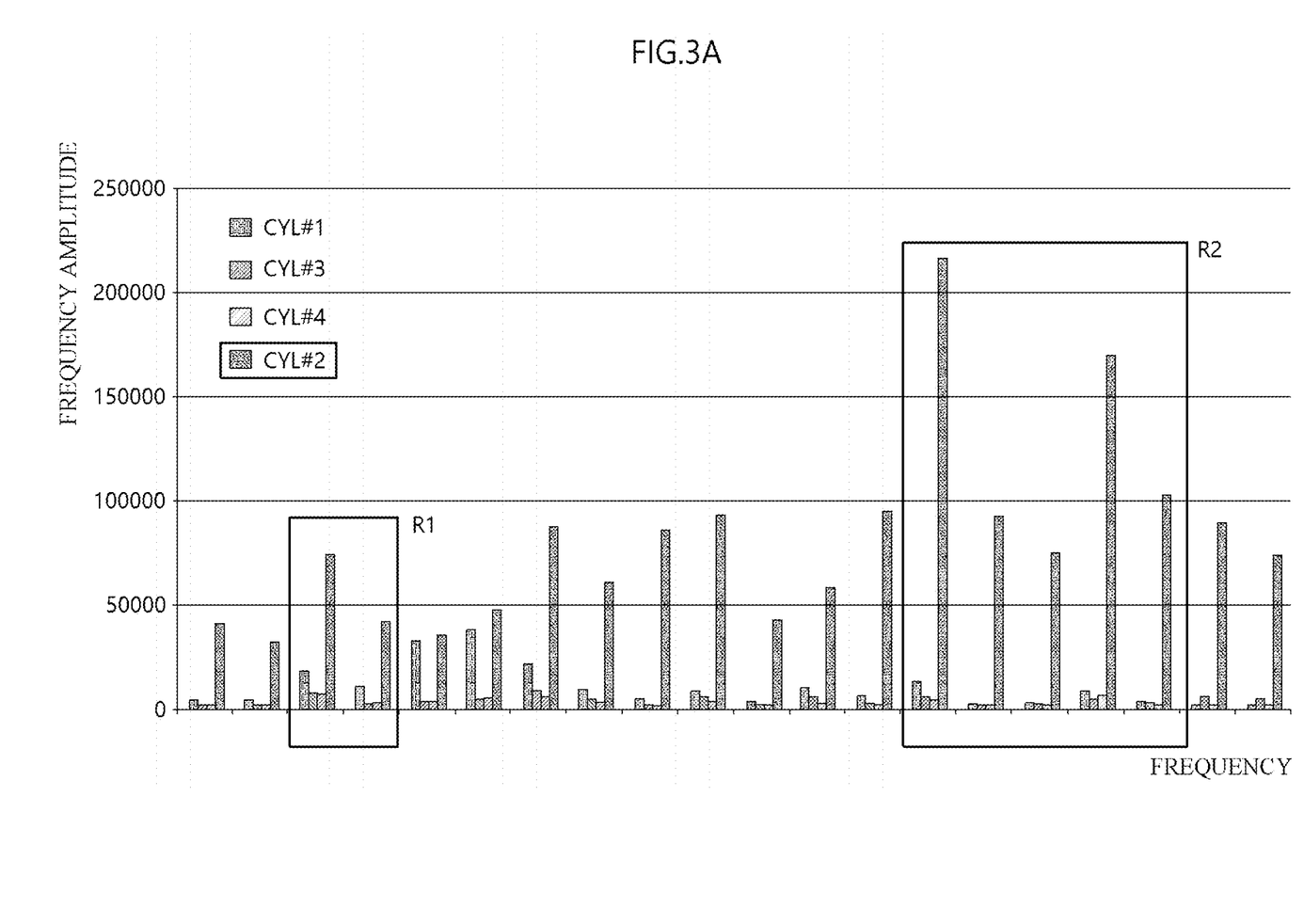
FIG. 3A is a graph illustrating an amplitude for each frequency by performing FFT for a vibration signal when a strong knocking occurs.

That is, as illustrated in FIG. 3A, it may be seen that when an ignition angle advances for a predetermined time such that knocking occurs only in a second cylinder of an engine in which a bearing is not damaged, a signal in a knocking frequency band (R2) monitoring knocking of the engine as well as in the bearing damage frequency band (R1) is also increased together.

Figure 3B:
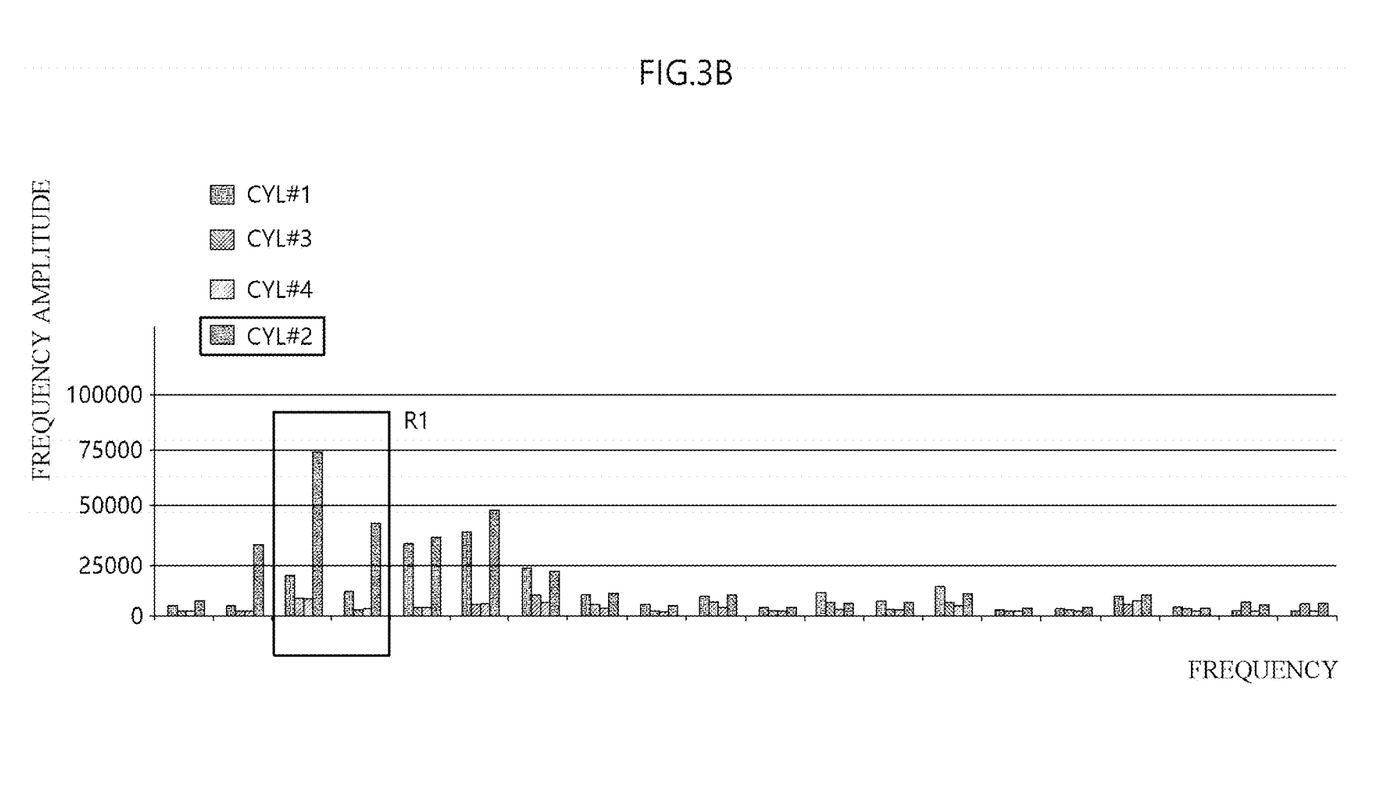
FIG. 3B is a graph illustrating an amplitude for each frequency by performing the FFT for a vibration signal when the bearing is damaged.

The related art transforms only the signal in the bearing damage frequency band (R1) using a band-pass filter 22, and monitors the transformed signal. The damage to the bearing is detected only by comparing the transformed signal with a threshold of the magnitude of vibration in the bearing damage frequency band. When the engine in which the bearing is damaged is operated in the same condition as that of FIG. 3A, as illustrated in FIG. 3B, only the signal in the bearing damage frequency band (R1) should be increased.

However, there is a problem in that if a strong knocking occurs, the signal in the knocking frequency band (R2) as well as in the bearing damage frequency band (R1) is also increased together, and the bearing is falsely detected as being damaged only due to an increase in the vibration in the bearing damage frequency band (R1).

Further, if the band-pass filter is used, a neighboring frequency component as well as a center frequency is also used for detecting the damage to the bearing, such that bearing damage detection performance is inevitably reduced.

Further, since a natural frequency component generated when the bearing is damaged is different for each engine, there is a problem in that significant time and expense are required for selecting a band-pass filter suitable for each engine.

The contents described in Description of Related Art are to help the understanding of the background of the present disclosure, and may include what is not previously known to those skilled in the art to which the present disclosure pertains.

SUMMARY

The present disclosure provides a system and method for detecting damage to a bearing of an engine using a knocking sensor, which may perform Fast Fourier Transform for a signal in an entire frequency band detectable by the knocking sensor, which includes a knocking frequency band as well as a bearing damage frequency band, and a signal in the bearing damage frequency band, and then compare the transformed frequencies with a preset exclusion condition to exclude a vibration signal irrelevant to damage to the bearing, thereby preventing false detection.

A system for detecting damage to a bearing of an engine using a knocking sensor according to the present disclosure for achieving the object includes a data storing unit for storing a vibration signal output from a knocking sensor installed in an engine, a frequency amplitude calculating unit for calculating an amplitude for each frequency by performing Fast Fourier Transform (FFT) for the vibration signal input to the data storing unit, a detection frequency integrating unit for integrating amplitudes of frequencies with discrimination selected by a detection frequency selecting unit, a noise determining unit for determining whether the vibration signal of the knocking sensor is the vibration signal irrelevant to damage to a bearing by determining whether an exclusion frequency selected by an exclusion frequency selecting unit corresponds to a preset condition, and a damage determining unit for confirming that the bearing is damaged by increasing a damage counter, when the vibration signal of the knocking sensor is the vibration signal due to the damage to the bearing, and a detection frequency integration value obtained by integrating the amplitudes of the detection frequencies is greater than a preset damage threshold.

The frequency amplitude calculating unit calculates an amplitude for each predetermined frequency interval by performing Fast Fourier Transform (FFT) for the vibration signal stored in the data storing unit.

The noise determining unit determines the vibration signal of the knocking sensor as the vibration signal irrelevant to the damage to the bearing, when a value obtained by summing all amplitudes of the exclusion frequencies exceeds a preset reference.

The noise determining unit determines the vibration signal of the knocking sensor as the vibration signal irrelevant to the damage to the bearing, when an exclusion frequency with the largest amplitude among the exclusion frequencies is within a predetermined ranking among all frequencies.

The noise determining unit determines the vibration signal of the knocking sensor as the vibration signal irrelevant to the damage to the bearing, when a ratio of an exclusion frequency with the largest amplitude among the exclusion frequencies and the detection frequency exceeds a predetermined ratio.

The damage determining unit increases the damage counter, when the detection frequency integration value is greater than the damage threshold, and confirms that the bearing is damaged, when the damage counter is greater than or equal to a preset confirmation counter, which confirms that the bearing is damaged.

The damage determining unit sets the damage threshold, the damage counter, and the preset confirmation counter for each operation mode of the engine.

The damage determining unit confirms the damage to the bearing by being divided into a case where combustion is constantly performed and a case where the combustion is not constantly performed in the engine.

The damage determining unit confirms the damage to the bearing by being divided into a case where the engine is traveled in a general traveling mode including a full load, a part load, and an idle, and a case where the engine is traveled by including the entry into a fuel cut, just before the fuel cut, just after the fuel cut, or a tip out.

The system for detecting the damage to the bearing of the engine using the knocking sensor further includes a limp home control unit for restricting an RPM of the engine to a preset safety RPM or less such that the engine is operated at the preset safety RPM or less, when the damage determining unit confirms the damage to the bearing.

A method for detecting damage to a bearing of an engine using a knocking sensor according to the present disclosure includes a data storing step, which stores a vibration signal output from a knocking sensor installed in an engine in a data storing unit, a by-frequency amplitude calculating step, which performs, by a frequency amplitude calculating unit, Fast Fourier Transform (FFT) for the vibration signal input to the data storing unit and calculates an amplitude for each frequency, a detection frequency integrating step, which obtains a detection frequency integration value by adding all amplitudes of detection frequencies selected by a detection frequency selecting unit, a noise determining step, which determines, by a noise determining unit, whether the vibration signal of the knocking sensor is the vibration signal irrelevant to damage to a bearing by determining whether exclusion frequencies selected by an exclusion frequency selecting unit correspond to a preset condition, a counter increasing step, which increases a damage counter, when the detection frequency integration value is greater than a preset damage threshold, if the vibration signal of the knocking sensor is the vibration signal due to the damage to the bearing, and a damage confirming step, which confirms that the bearing is damaged, when the damage counter is greater than or equal to a preset confirmation counter.

The data storing step stores a converted vibration signal in the data storing unit by converting the vibration signal output from the knocking sensor into a digital signal in a state where a measurement window is open.

The by-frequency amplitude calculating step calculates an amplitude for each predetermined frequency interval by performing Fast Fourier Transform (FFT) for the vibration signal stored in the data storing unit.

The noise determining step determines the vibration signal of the knocking sensor as the vibration signal irrelevant to the damage to the bearing, when a value obtained by summing all amplitudes of the exclusion frequencies exceeds a preset reference.

The noise determining step determines the vibration signal of the knocking sensor as the vibration signal irrelevant to the damage to the bearing, when an exclusion frequency with the largest amplitude among the exclusion frequencies is within a predetermined ranking among all frequencies.

The noise determining step determines the vibration signal of the knocking sensor as the vibration signal irrelevant to the damage to the bearing, when a ratio of an exclusion frequency with the largest amplitude among the exclusion frequencies and the detection frequency exceeds a predetermined ratio.

When the noise determining step determines that the vibration signal detected by the knocking sensor is likely relevant to the damage to the bearing, an operation mode determining step, which determines whether an operation mode of the engine is currently a general traveling mode in which combustion is constantly performed in the engine, is performed.

Between the operation mode determining step and the counter increasing step, an integration value applying step, which sets the detection frequency integration value as a comparison target, and an integration value comparing step, which compares the integration value with the damage threshold, are performed.

When the operation mode determining step determines the operation mode as the general traveling mode, the integration value applying step uses the detection frequency integration value as a reference value, compares the reference value with a first damage threshold set for detecting the damage to the bearing upon traveling in the general traveling mode, and increases a first damage counter, when the reference value exceeds the first damage threshold.

The operation mode determining step includes a state where the engine is operated in any one of a full load, a part load, and an idle.

When the operation mode determining step determines that the operation mode is not the general traveling mode because combustion is not constantly performed in the engine, the integration value applying step uses the detection frequency integration value as an instance value, compares the instance value with a second damage threshold set for detecting the damage to the bearing if the operation mode is not the general traveling mode, and increases a second damage counter, when the instance value exceeds the second damage threshold.

The operation mode determining step includes operating the engine in a state of the entry into a fuel cut, just before the fuel cut, just after the fuel cut, or a tip out.

The damage counter is set to increase for each operation mode of the engine.

After the damage confirming step, a limp home control step, which controls the engine in a limp home mode which controls the engine by restricting an RPM of the engine to a preset safety RPM or less, is performed.

The method for detecting the damage to the bearing of the engine using the knocking sensor further includes a noise confirming step, which confirms the vibration signal of the knocking sensor as the vibration signal irrelevant to the damage to the bearing, when the exclusion frequencies selected by the exclusion frequency selecting unit satisfy the preset condition in the noise determining step, and after the noise determining step, an engine operation determining step, which returns the step to the data storing step when the engine is being operated, and terminates the step when the engine is not being operated by determining whether the engine is operated.

The system and method for detecting the damage to the bearing of the engine using the knocking sensor according to the present disclosure having the above configuration may monitor the vibration signal in the entire frequency band detectable by the knocking sensor, which includes the knocking frequency band as well as the bearing damage frequency band, to exclude the vibration signal irrelevant to the damage to the bearing, thereby preventing false detection which may be caused in the case of monitoring only the bearing damage frequency band.

Further, since the neighboring frequency component other than the center frequency is excluded and only the frequency with excellent discrimination is integrated, detection performance becomes excellent.

Further, since the process of selecting the band-pass filter suitable for each engine is not needed, the number of man-hours for detecting the damage to the bearing is reduced.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system and a method for detecting damage to a bearing of an engine using a knocking sensor according to the present disclosure will be described in detail with reference to the accompanying drawings.

Figure 1:
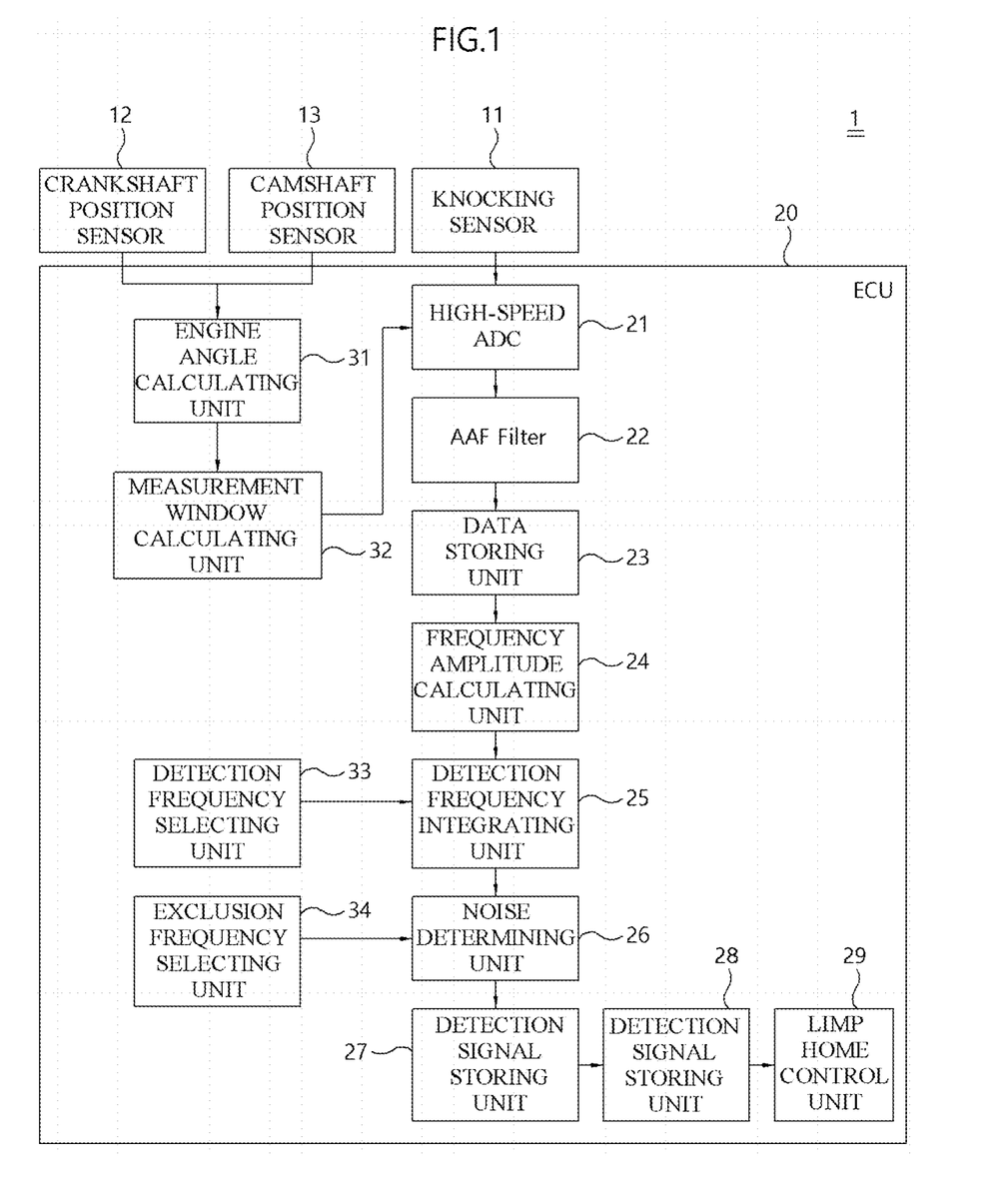
FIG. 1 is a block diagram illustrating a system for detecting damage to a bearing of an engine using a knocking sensor according to the present disclosure.

As illustrated in FIG. 1, a system for detecting damage to a bearing of an engine using a knocking sensor according to the present disclosure includes a data storing unit 23 for storing a vibration signal output from a knocking sensor 11 installed in an engine, a frequency amplitude calculating unit 24 for calculating an amplitude for each frequency by performing Fast Fourier Transform for a vibration signal input to the data storing unit 23, a detection frequency integrating unit 25 for integrating amplitudes of frequencies with discrimination selected by a detection frequency selecting unit 33, a noise determining unit 26 for determining whether the vibration signal of the knocking sensor 11 is the vibration signal irrelevant to damage to a bearing by determining whether an exclusion frequency selected by an exclusion frequency selecting unit 34 corresponds to a preset condition, and a damage determining unit 28 for confirming that the bearing is damaged by increasing damage counters (C_R) (C_I), when the vibration signal of the knocking sensor 11 is the vibration signal due to the damage to the bearing and a detection frequency integration value obtained by integrating the amplitudes of the detection frequencies is greater than preset damage thresholds (TH_R) (TH_J).

A system 1 for detecting damage to a bearing of an engine using a knocking sensor according to the present disclosure is provided inside an engine control unit (ECU) for a vehicle.

An ECU 20 is used to receive signals output from the knocking sensor 11, a crankshaft position sensor 12, and a camshaft position sensor 13, which are provided outside the ECU 20, to detect damage to a bearing.

The knocking sensor 11 is attached to one side of an engine to detect vibration generated by the engine.

The crankshaft position sensor 12 detects a rotating angle of a crankshaft of the engine, and the camshaft position sensor 13 detects a rotating angle of a camshaft. The crankshaft position sensor 12 and the camshaft position sensor 13 are used to calculate a rotating angle of the engine.

An engine angle calculating unit 31 calculates the rotating angle of the engine using data input from the crankshaft position sensor 12 and the camshaft position sensor 13.

For example, in the case of a four-stroke and a four-cylinder engine, the crankshaft is rotated by 720 degrees while combustion is performed in each cylinder for one cycle, and the rotating angle is calculated by the engine angle calculating unit 31.

A measurement window calculating unit 32 calculates a measurement window, which is in a range of a specific rotating angle of the engine in which a signal for detecting the damage to the bearing may be generated, using data calculated by the engine angle calculating unit 31. According to an operation state of the engine, a predetermined range around a top dead center (TDC) becomes the measurement window, and the measurement window calculating unit 32 calculates the measurement window.

A high-speed analog-digital converter (ADC) 21 receives, as analog signals, signals output from various installed sensors including the knocking sensor 11, which are input for the damage to the bearing, or signals obtained by processing these signals. The high-speed ADC 21 converts the analog signal into a digital signal when receiving the analog signal.

The high-speed ADC 21 receives a vibration signal from the knocking sensor 11, and converts the analog signal input from the knocking sensor 11.

Further, the high-speed ADC 21 receives the signal output from the measurement window calculating unit 32. Therefore, the high-speed ADC 21 receives the signal output from the knocking sensor 11 while the measurement window is open.

A filter 22 removes electrical noise included in the input signal. The filter may be provided as an anti-aliasing filter (AAF).

The data storing unit 23 stores data in which noise is removed by the filter 22. The data is the data having undergone the high-speed ADC 21 and the filter 22, and thus is digitally converted, and becomes a state where the electrical noise is removed.

The frequency amplitude calculating unit 24 calculates an amplitude for each frequency by performing Fast Fourier Transform (FFT) for the data stored in the data storing unit 23. The size of the measurement window is similar for each RPM of the engine, and a sampling speed of the knocking sensor 11 is 100 kHz, and the number of sampling speeds is stored as about 128, which is one of $2^n$, through the FFT. Therefore, about 0.78 kHz, which is a value obtained by dividing the sampling speed by 128, becomes a resolution of the data having undergone the FFT. The frequency amplitude calculating unit 24 calculates an amplitude for each frequency in units of 1 kHz by approximating the resolution from 0 kHz to 30 kHz so as to include all of a frequency at which the damage to the bearing is easily detected and a frequency at which knocking of the engine is detected.

Figure 4:
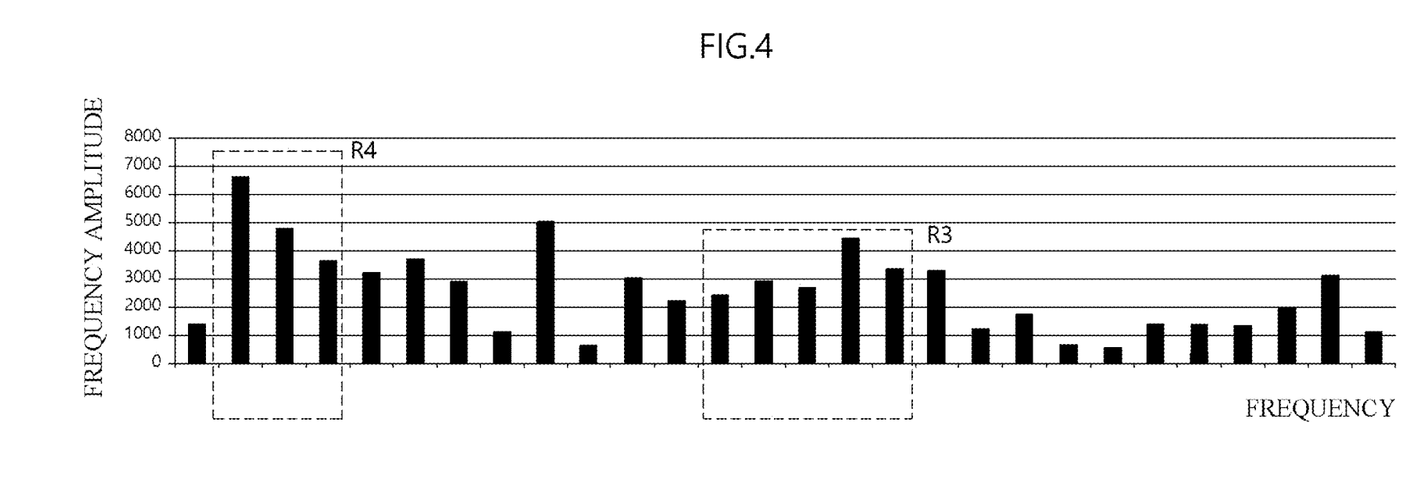
FIG. 4 is a graph illustrating an amplitude for each frequency by performing the FFT for a vibration signal of a specific cylinder.

The amplitude calculated for each frequency by the frequency amplitude calculating unit 24 may also be indicated by a graph having the form illustrated in FIG. 3A, 3B, or 4. FIGS. 3A and 3B illustrate frequency amplitudes of four cylinders at 1 kHz intervals from 1 kHz to 20 kHz, and FIG. 4 illustrates a frequency amplitude of a specific cylinder at 1 kHz intervals from 2 kHz to 29 kHz.

The detection frequency integrating unit 25 adds amplitudes of frequencies in a band in which the damage to the bearing may be well detected.

When a detection frequency selecting unit 33 selects a detection frequency, which is a frequency with excellent discrimination according to an RPM, an amount of air, and a cylinder, to deliver the detection frequency to the detection frequency integrating unit 25, the detection frequency integrating unit 25 obtains a detection frequency integration value, which is an integration value of the detection frequency, by adding all of the amplitudes of the frequencies corresponding to the detection frequency among the results calculated by the frequency amplitude calculating unit 24.

For example, when the detection frequency selecting unit 33 selects 2 kHz to 5 kHz as the detection frequency, the detection frequency integrating unit 25 adds all amplitudes of 2 kHz, 3 kHz, 4 kHz, and 5 kHz.

The noise determining unit 26 determines whether the vibration signal output from the knocking sensor 11 is the vibration signal irrelevant to the damage to the bearing. The noise determining unit 26 determines whether the vibration signal of the knocking sensor 11 is noise, that is, the vibration signal irrelevant to the damage to the bearing by determining whether the exclusion frequencies selected by the exclusion frequency selecting unit 34 correspond to a preset condition.

For example, when the exclusion frequency selecting unit 34 selects the band of 14 kHz to 18 kHz as the exclusion frequency, the noise determining unit 26 determines whether the exclusion frequency is noise using the frequencies of 14 kHz to 18 kHz. Here, the noise means a signal in a region not used for detecting the damage to the bearing, and is not used for determining the damage to the bearing, but may be used for detecting knocking or the like.

The exclusion frequency is generally set in a frequency band advantageous for detecting the knocking of the engine, and the noise determining unit 26 determines the usefulness of the vibration signal input to the knocking sensor 11, that is, whether the signal of the knocking sensor 11 may be used for detecting the damage to the bearing in this segment (while the engine rotates for one cycle) using the characteristic of the exclusion frequency.

The detection frequency signal is used for detecting the damage to the bearing, but the usefulness for the detection of the damage to the bearing is determined using the exclusion frequency.

Meanwhile, a process in which the noise determining unit 26 determines the noise will be described as follows.

First, when a value obtained by summing all amplitudes of the exclusion frequencies exceeds a preset reference, the noise determining unit 26 may determine the vibration signal of the knocking sensor 11 as the vibration signal irrelevant to the damage to the bearing. For example, if the exclusion frequency selecting unit 34 selects 14 kHz to 18 kHz as the exclusion frequency, assuming that the amplitude of each exclusion frequency is A14, A15, A16, A17, and A18, respectively, when the sum thereof (A14+A15+A16+A17+A18) exceeds the preset reference, the noise determining unit 26 determines the vibration signal collected by the knocking sensor 11 as noise, that is, the vibration signal irrelevant to the damage to the bearing. That is, in FIG. 4, when the sum of the amplitudes of all frequencies in an R3 band exceeds the preset reference, the vibration signal of the knocking sensor 11 may be regarded as the signal irrelevant to the damage to the bearing. FIG. 4 illustrates the amplitude of the frequency in each frequency band at 1 kHz intervals from 2 kHz to 29 kHz, and the sum of the amplitudes of all frequencies from 2 kHz to 29 kHz are compared with the preset reference.

Second, when an exclusion frequency with the largest amplitude among the exclusion frequencies is within a predetermined ranking among all frequencies, the noise determining unit 26 may determine the vibration signal of the knocking sensor 11 as noise, that is, the vibration signal irrelevant to the damage to the bearing. For example, it may be set to determine, as noise, that the exclusion frequency with the largest amplitude is within the third place among all frequencies. That is, if all frequencies are 1 kHz to 30 kHz and the exclusion frequency selecting unit 34 selects 14 kHz to 18 kHz as the exclusion frequency, assuming that the amplitude of each exclusion frequency is A14, A15, A16, A17, and A18, respectively, when any one among them is within the third place in the amplitudes for all frequencies, it is determined as noise. In FIG. 4, the amplitude of 17 kHz is the third place, such that the vibration signal illustrated in FIG. 4 may be regarded as noise.

Third, when a ratio of the exclusion frequency with the largest amplitude among the exclusion frequencies and the detection frequency exceeds a predetermined ratio, the noise determining unit 26 may determine the vibration signal of the knocking sensor 11 as the vibration signal irrelevant to the damage to the bearing. For example, if the frequency amplitude of 17 kHz is largest in a state where the exclusion frequency selecting unit 34 selects 14 kHz to 18 kHz as the exclusion frequency, and the detection frequency selecting unit 33 selects 4 kHz (here the frequency amplitude of 4 kHz is A4) as the detection frequency, when A17/A4 exceeds a predetermined value, the noise determining unit 26 determines the vibration signal as noise.

If any one of the three conditions is satisfied, the noise determining unit 26 determines the vibration signal of the knocking sensor 11 as the vibration signal irrelevant to the damage to the bearing, and does not detect the damage to the bearing any more.

The noise determining unit 26 determines the vibration signal of the knocking sensor 11 as the signal useful for detecting the damage to the bearing, only when all of the three conditions are not satisfied, and diagnoses the damage to the bearing.

A detection signal storing unit 27 stores a signal value, which is calculated for each operation mode of the engine by the frequency amplitude calculating unit 24, for each operation mode of the engine. For example, the engine may be traveled in a general traveling mode including a full load, a part load, and an idle, in which combustion is constantly performed. Further, the engine may be traveled in a state which is not the general traveling mode, in which a combustion state is changed, such as the entry into a fuel cut, just before the fuel cut, just after the fuel cut, or a tip out. The detection signal storing unit 27 classifies the signal value calculated by the frequency amplitude calculating unit 24 into a case in the general traveling mode and a case in a non-general traveling mode and stores each of the signal values.

The damage determining unit 28 confirms the damage to the bearing using the detection frequency integration value.

For example, in FIG. 4, the damage determining unit 28 confirms the damage to the bearing using the detection frequency integration value, which is the sum of the amplitudes of all frequencies in an R4 band.

The damage determining unit 28 compares the detection frequency integration value with the predetermined damage thresholds (TH_R) (TH_I), and increases the damage counters (C_R) (C_I) according to the comparison result. This is repeated while the engine is operated, and when the damage counters (C_R) (C_I) are greater than or equal to preset confirmation counters (TH_CR) (TH_CI), which confirm that the bearing is damaged, the damage determining unit 28 confirms that the bearing is damaged.

Meanwhile, the damage determining unit 28 sets the damage thresholds (TH_R) (TH_I), the damage counters (C_R) (C_I), and the preset confirmation counters (TH_CR) (TH_CI) for each operation mode of the engine, and also compares the detection frequency integration value with each of the damage thresholds (TH_R) (TH_I) for each operation mode, and when the damage counters (C_R) (C_I) are greater than or equal to the preset confirmation counters (TH_CR) (TH_CI), the damage determining unit 28 confirms that the bearing is damaged.

When the damage to the bearing is confirmed, a limp home control unit 29 controls the engine in a limp home mode to restrict an RPM of the engine to a preset safety RPM or less. As the engine is controlled in the limp home mode, it is possible to prevent the damage to the bearing from further proceeding, and to allow the bearing to move to a serviceable position.

Further, the limp home control unit 29 turns on an MIL lamp such that a driver may easily perceive the damage to the bearing.

Figure 2A:
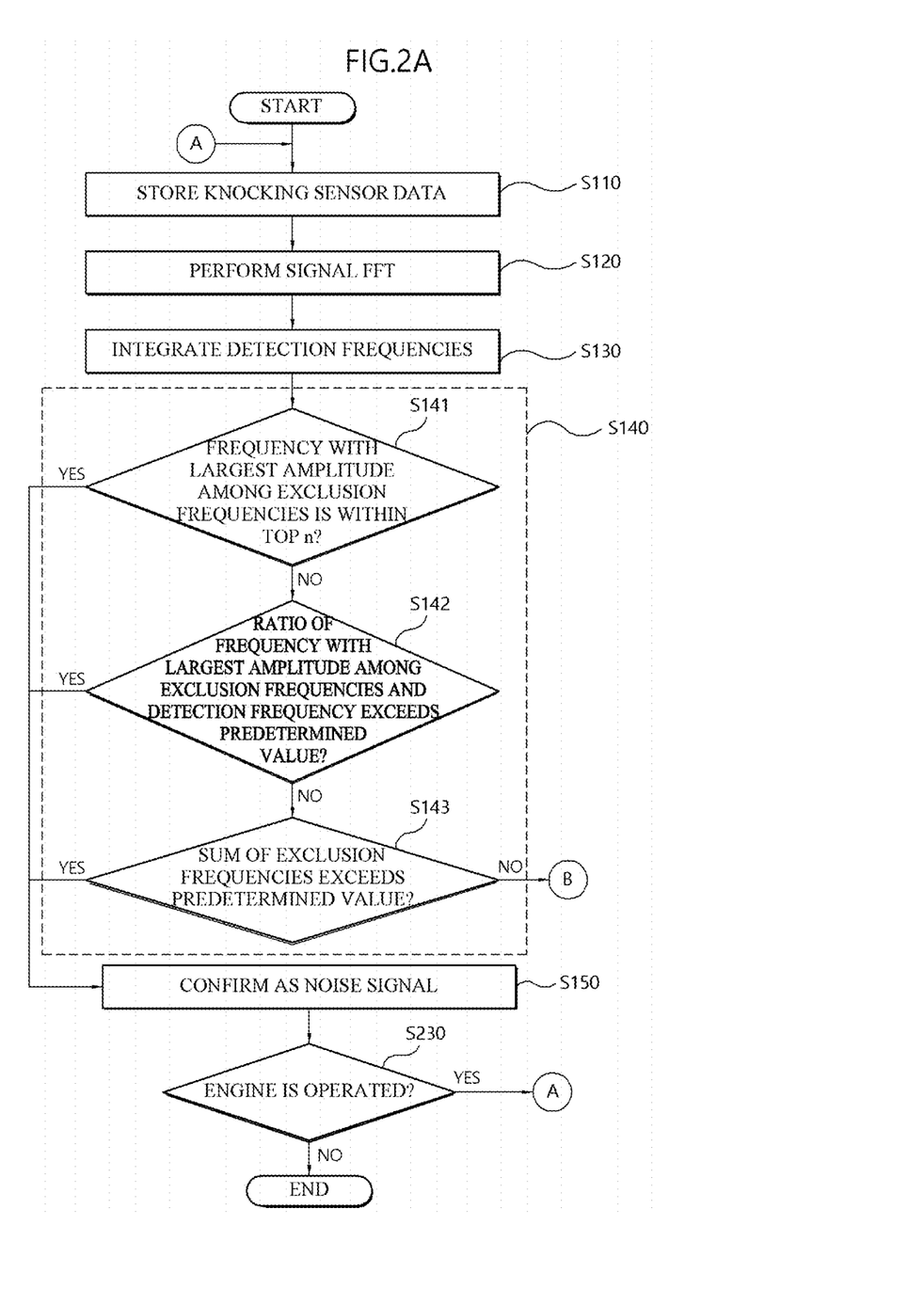
FIGS. 2A and 2B are flowcharts illustrating a method for detecting the damage to the bearing of the engine using the knocking sensor according to the present disclosure.
Figure 2B:
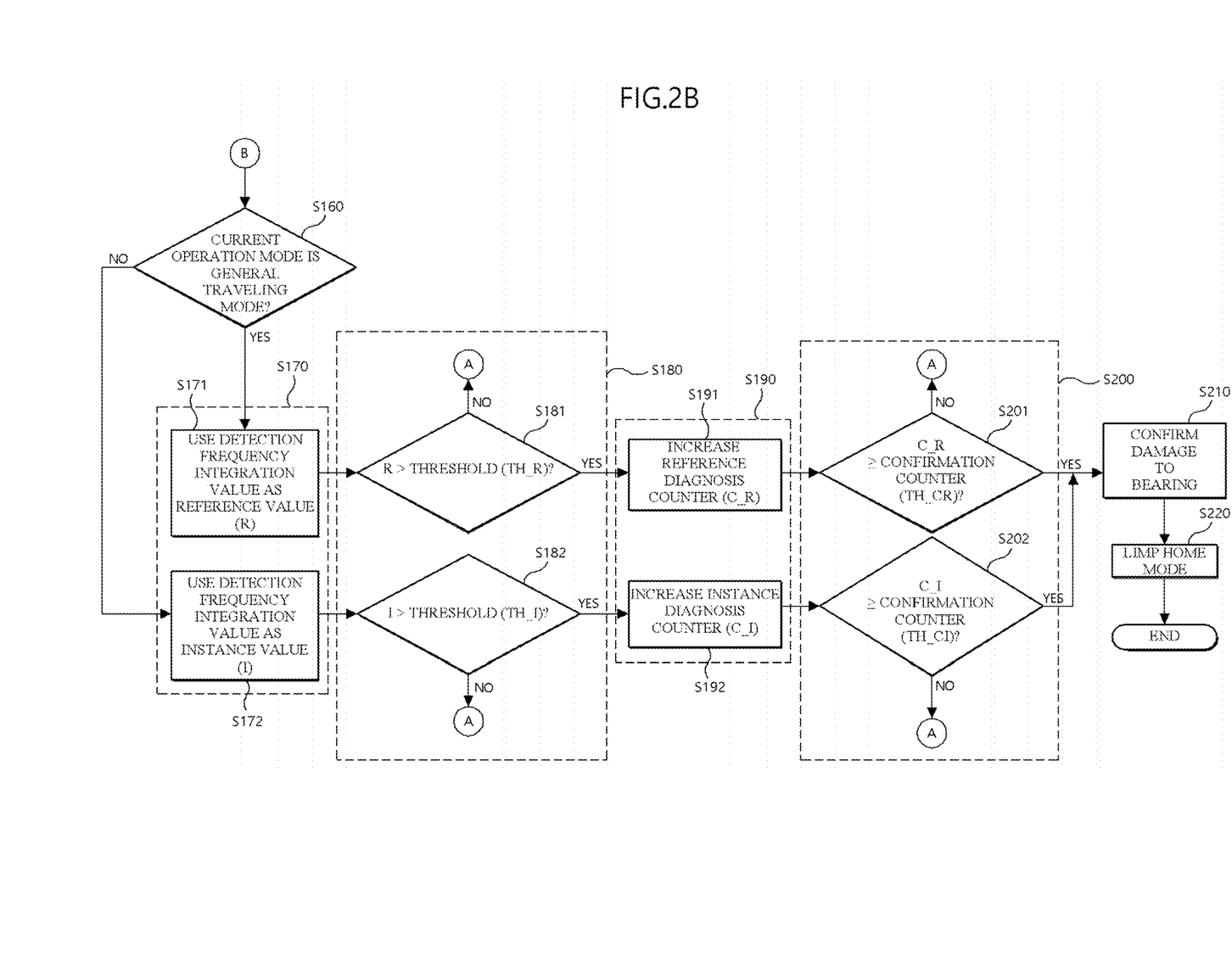

FIGS. 2A and 2B are flowcharts illustrating a method for detecting damage to a bearing of an engine using a knocking sensor according to the present disclosure.

The method for detecting the damage to the bearing of the engine using the knocking sensor according to the present disclosure is performed by the system 1 for detecting the damage to the bearing of the engine using the knocking sensor according to the present disclosure described above, and includes a data storing step (S110), which stores the vibration signal output from the knocking sensor 11 installed in the engine in the data storing unit 23, a by-frequency amplitude calculating step (S120), which performs, by the frequency amplitude calculating unit 24, Fast Fourier Transform (FFT) for the vibration signal input to the data storing unit 23 and calculates an amplitude for each frequency, a detection frequency integrating step (S130), which obtains a detection frequency integration value by adding all amplitudes of the detection frequencies selected by the detection frequency selecting unit 33, a noise determining step (S140), which determines, by the noise determining unit 26, whether the vibration signal of the knocking sensor 11 is the vibration signal irrelevant to the damage to the bearing by determining whether the exclusion frequencies selected by the exclusion frequency selecting unit 34 correspond to the preset condition, a counter increasing step (S190), which increases the damage counters (C_R) (C_I), when the detection frequency integration value is greater than the preset damage thresholds (TH_R) (TH_I), if the vibration signal of the knocking sensor 11 is the vibration signal due to the damage to the bearing, and a damage confirming step (S210), which confirms that the bearing is damaged, when the damage counters (C_R) (C_I) are greater than or equal to the preset confirmation counters (TH_CR) (TH_CI).

The data storing step (S110) stores the vibration signal output from the knocking sensor 11 installed in the engine in the data storing unit 23. The vibration signal detected by the knocking sensor 11 is converted into a digital signal, and stored in the data storing unit 23 in a state where electrical noise is removed.

The by-frequency amplitude calculating step (S120) performs, by the frequency amplitude calculating unit 24, the Fast Fourier Transform (FFT) for the vibration signal input to the data storing unit 23 and calculates an amplitude for each frequency.

The detection frequency integrating step (S130) obtains the detection frequency integration value by adding all amplitudes of the detection frequencies selected by the detection frequency selecting unit 33.

The noise determining step (S140) determines, by the noise determining unit 26, whether the vibration signal detected by the knocking sensor 11 is the vibration signal irrelevant to the damage to the bearing by determining whether the exclusion frequencies selected by the exclusion frequency selecting unit 34 correspond to the preset condition.

Meanwhile, the noise determining step (S140) includes a first noise determining step (S141) to a third noise determining step (S143) below in order to determine whether the exclusion frequencies selected by the exclusion frequency selecting unit 34 correspond to the preset condition.

When a value obtained by summing all amplitudes of the exclusion frequencies exceeds a preset reference, the first noise determining step (S141) determines the vibration signal detected by the knocking sensor 11 as the vibration signal irrelevant to the damage to the bearing. For example, if the exclusion frequency selecting unit 34 selects the exclusion frequency as 14 kHz to 18 kHz, assuming that the amplitude of each exclusion frequency is A14, A15, A16, A17, and A18, respectively, when the sum thereof (A14+A15+A16+A17+A18) exceeds the preset reference, the first noise determining step (S141) determines the vibration signal collected by the knocking sensor 11 as noise, that is, the vibration signal irrelevant to the damage to the bearing. That is, in FIG. 4, when the sum of the amplitudes of all frequencies in an R3 band exceeds the preset reference, the vibration signal of the knocking sensor 11 may be regarded as noise.

When an exclusion frequency with the largest amplitude among the exclusion frequencies is within a predetermined ranking among all frequencies, the second noise determining step (S142) determines the vibration signal detected by the knocking sensor 11 as the vibration signal irrelevant to the damage to the bearing. For example, it may be set to determine, as noise, that the exclusion frequency with the largest amplitude is within the third place among all frequencies. That is, if all frequencies are 1 kHz to 30 kHz and the exclusion frequency selecting unit 34 selects the exclusion frequency as 14 kHz to 18 kHz, assuming that the amplitude of each exclusion frequency is A14, A15, A16, A17, and A18, respectively, when any one among them is within the third place in the amplitudes for all frequencies, it is determined as noise. In FIG. 4, the amplitude of 17 kHz is the third place, such that the vibration signal illustrated in FIG. 4 may be regarded as noise.

When a ratio of the exclusion frequency with the largest amplitude among the exclusion frequencies and the detection frequency exceeds a predetermined value, the third noise determining step (S143) determines the vibration signal detected by the knocking sensor 11 as the vibration signal irrelevant to the damage to the bearing. For example, if the frequency amplitude of 17 kHz is largest in a state where the exclusion frequency selecting unit 34 selects 14 kHz to 18 kHz as the exclusion frequency, and the detection frequency selecting unit 33 selects 4 kHz (here, the frequency amplitude of 4 kHz is A4) as the detection frequency, when A17/A4 exceeds a predetermined value, the third noise determining step (S143) determines the vibration signal as noise.

Here, if all of the first noise determining step (S141) to the third noise determining step (S143) are not applicable, an operation mode determining step (S160) is performed, and if any one of the first noise determining step (S141) to the third noise determining step (S143) is applicable, a noise confirming step (S150) is performed.

Further, the first noise determining step (S141) to the third noise determining step (S143) may be performed in any order.

If the noise determining step (S140) is satisfied, the noise confirming step (S150) confirms the vibration signal detected by the knocking sensor 11 as the vibration signal irrelevant to the damage to the bearing. That is, if any one of the first noise determining step (S141) to the third noise determining step (S143) is satisfied, the vibration signal detected by the knocking sensor 11 is regarded as being irrelevant to the damage to the bearing.

After the noise confirming step (S150) is performed, an engine operation determining step (S230), which determines whether the engine is operated, is performed. When the engine is being operated, the process returns back to the beginning, and when the engine is not in an operation state, the process is terminated.

Meanwhile, as the result of the noise determining step (S140), when it is determined that the vibration signal detected by the knocking sensor 11 is not the noise, a signal value calculated by the frequency amplitude calculating unit 24 is stored in the detection signal storing unit 27 for each operation mode.

The fact indicating that all of the first noise determining step (S141) to the third noise determining step (S143) are not applicable only means that the vibration signal detected by the knocking sensor 11 may be relevant to the damage to the bearing, and the fact in itself does not mean the damage to the bearing. The damage to the bearing may be confirmed by a logic performed after the operation mode determining step (S160).

The operation mode determining step (S160) is performed if the noise determining step (S140) determines that the vibration signal detected by the knocking sensor 11 is relevant to the damage to the bearing.

The operation mode determining step (S160) determines whether an operation mode of the engine is currently a general traveling mode in which combustion is performed in the engine. The reason why the operation mode of the engine is determined is that the detection frequency integration value is compared with the damage thresholds (TH_R) (TH_I) for detecting the damage to the bearing and the detection frequency integration value and the damage thresholds (TH_R) (TH_I) are changed according to the operation mode of the engine.

Here, the general traveling mode is a case where combustion is constantly performed in the engine, and includes a case where the engine is operated in a full load, a part load, or an idle.

After the operation mode determining step (S160) is performed, an integration value applying step (S170), which applies the detection frequency integration value as a comparison target, an integration value comparing step (S180), which compares the integration value with the damage thresholds (TH_R) (TH_I) for determining the damage to the bearing, the counter increasing step (S190), which increases the damage counters (C_R) (C_I) when the integration value is greater than the damage thresholds (TH_R)

(TH_I), and a counter comparing step (S200), which compares the damage counters (C_R) (C_I) with the preset confirmation counters (TH_CR) (TH_CI), are performed.

When the damage counters (C_R) (C_I) are greater than or equal to the preset confirmation counters (TH_CR) (TH_CI) in the counter comparing step (S200), the damage confirming step (S210), which confirms that the bearing is damaged, is performed.

The integration value applying step (S170) to the counter comparing step (S200) are dualized and performed according to whether the engine is operated in the general traveling mode in the operation mode determining step (S160).

First, when the operation mode determining step (S160) determines that the engine is operated in the general traveling mode, a first integration value applying step (S171), which applies a value obtained by integrating the detection frequencies to a target for comparing the damage to the bearing, is performed. The first integration value applying step sets, as a comparison target, a reference value (R), which is an average of a current value and a past value for a predetermined period of time from the present.

Thereafter, a first integration value comparing step (S181), which compares the reference value (R) with a first damage threshold (TH_R) set for determining the damage to the bearing in the general traveling mode, is performed.

As the result of the first integration value comparing step (S181), when it is determined that the reference value (R) is greater than the first damage threshold (TH_R), i.e., (R>TH_R), a first counter increasing step (S191), which increases a first damage counter (C_R), is performed.

When the first damage counter (C_R) is increased compared to a previous value thereof, a first counter comparing step (S201), which compares the first damage counter (C_R) with a first confirmation counter (TH_CR), is performed.

When the first damage counter (C_R) is greater than or equal to the first confirmation counter (TH_CR), i.e., (C_R≥TH_CR) in the first counter comparing step (S201), the damage determining unit 28 confirms that the bearing is damaged.

When the reference value (R) is greater than the first damage threshold (TH_R), it may be immediately confirmed that the bearing is damaged, but the detection may be falsely performed by a temporary increase in the reference value (R). To prevent such a problem, as the first damage counter (C_R) is increased, when a case where the reference value (R) is greater than the first damage threshold (TH_R) is repeated, such that the first damage counter (C_R) is greater than or equal to the first confirmation counter (TH_CR), it is finally confirmed that the bearing is damaged.

Meanwhile, when the operation mode determining step (S160) determines that the engine is operated in a state which is not the general traveling mode, a second integration value applying step (S172) is performed. The case where an operation mode of the engine is not the general traveling mode is a state where the combustion state of the engine is changed, and includes a case where the engine is operated in a state of the entry into a fuel cut, just before the fuel cut, just after the fuel cut, or a tip out. In this state, since the vibration signal is also generated according to a change in the combustion state, the damage to the bearing is determined by being distinguished from the general traveling mode.

The second integration value applying step (S172) sets, as a comparison target, an instance value suitable for a momentary operation environment.

The following process is similar to the aforementioned process, and only the reference values used are different from each other.

That is, a second integration value comparing step compares the instance value (I) with a second damage threshold (TH_I) set for determining the damage to the bearing when the engine is operated in the case that is not the general traveling mode.

As the result of the second integration value comparing step (S182), when it is determined that the instance value (I) is greater than the second damage threshold (TH_I), i.e., (I>TH_I), a second counter increasing step (S192), which increases a second damage counter (C_I), is performed.

Thereafter, a second counter comparing step (S202), which compares the second damage counter (C_I) with a second confirmation counter (TH_CI), is performed.

When the second damage counter (C_I) is greater than or equal to the second confirmation counter (TH_CI), i.e., (C_I≥TH_CI) in the second counter comparing step (S202), the damage determining unit 28 confirms that the bearing is damaged.

After the damage confirming step (S210), a limp home control step (S220), which controls the engine in a limp home mode which controls the engine by restricting an RPM of the engine to a preset safety RPM or less, is performed. The limp home control unit 29 may restrict the RPM of the engine to the safety RPM or less, thereby preventing the damage to the bearing from further proceeding, and allowing the bearing to move to a serviceable position.

Further, in the limp home control step (S220), the limp home control unit 29 turns on an MIL lamp such that a driver may perceive the damage to the bearing.

The limp home control step (S220) is performed while the engine is being operated, and when the engine is not operated, the logic is terminated.

The system and method for detecting the damage to the bearing of the engine using the knocking sensor according to the present disclosure may consider the frequency in the remaining bands as well as the frequency at which the damage to the bearing is detected, thereby preventing false detection.

Figure 5A:
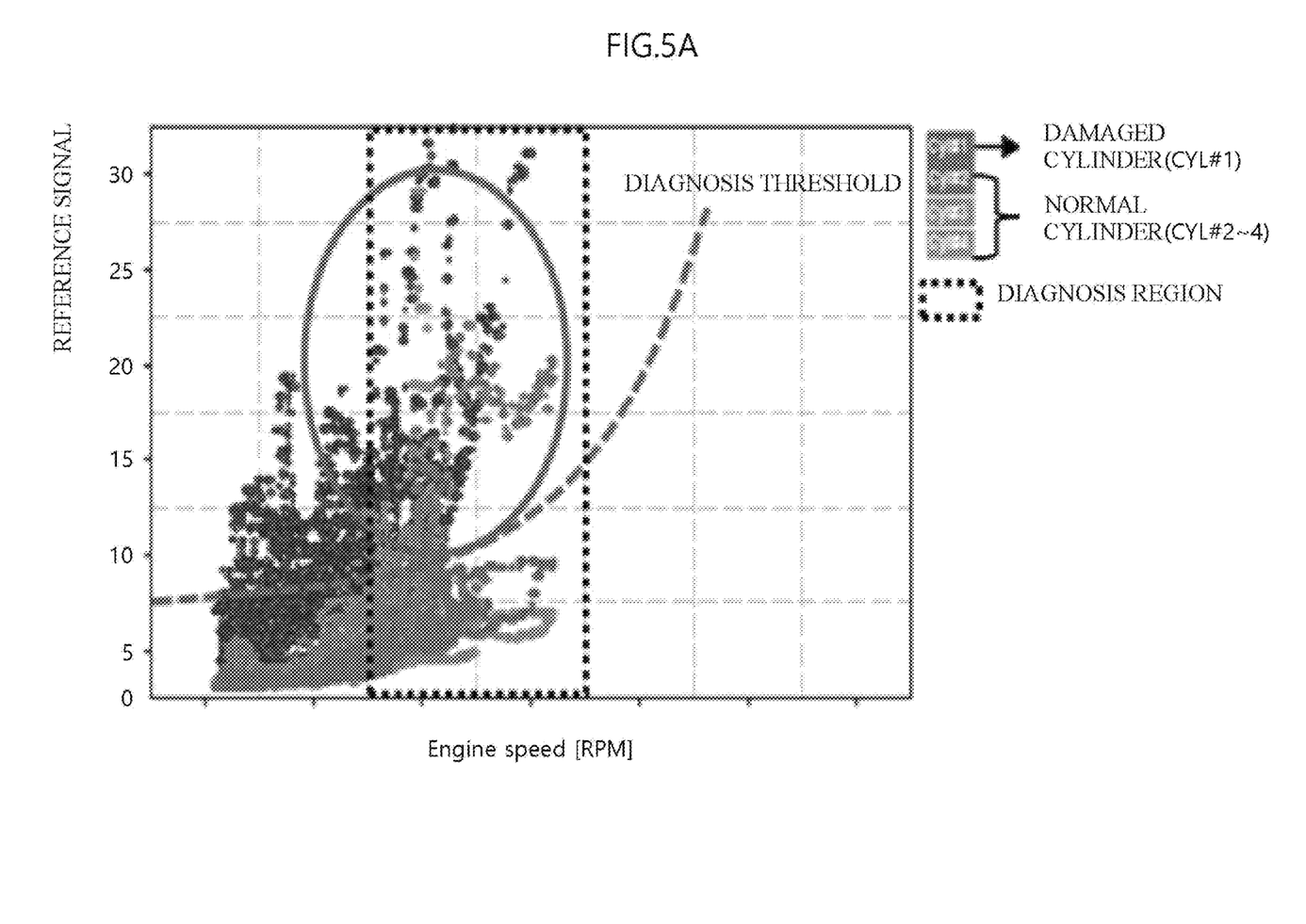
FIG. 5A is a graph illustrating an amplitude of a signal when the damage to the bearing is detected in a band-pass filter method.
Figure 5B:
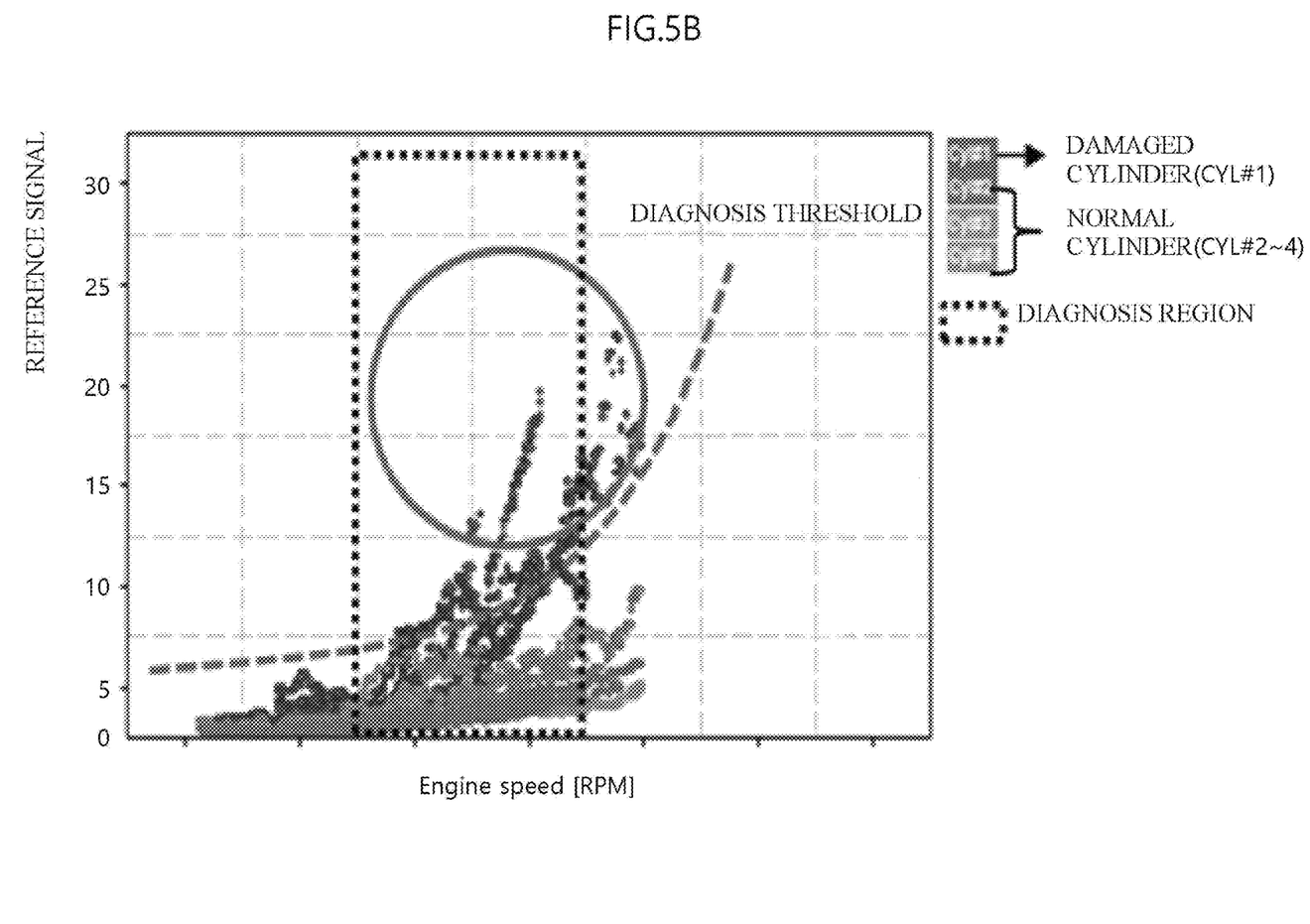
FIG. 5B is a graph illustrating an amplitude of a signal when the damage to the bearing is detected in an FFT method.

FIGS. 5A and 5B illustrate the results of detecting the damage to the bearing, after forcibly damaging a bearing of a specific cylinder. FIG. 5A is a case where the damage to the bearing is detected using a band-pass filter, and illustrates a phenomenon in which the amplitude of a failure signal is also increased in a normal cylinder as well as in a failure cylinder in a situation exceeding 2000 RPM at which a diagnosis region starts, when a band-pass filter of 4 kHz is used. However, in FIG. 5B to which the present disclosure is applied, signals of the failure cylinder and the normal cylinder may be separated, thereby preventing false detection.

Further, the conventional band-pass filter method should select a filter with the best performance for detection, and the characteristic of a natural frequency generated for each cylinder of each engine when the bearing is damaged is different, such that it is possible to detect the damage to the bearing only after all of N band-pass filter sets are evaluated. However, the present disclosure may know the characteristic of the natural frequency generated for each cylinder of each engine when a failure engine is operated only once, thereby omitting a process of selecting the band-pass filter.

What is claimed is:

1. A system for detecting damage to a bearing of an engine using a knocking sensor, the system comprising:
   a data storing unit for storing a vibration signal output from the knocking sensor installed in the engine;

a frequency amplitude calculating unit for calculating an amplitude for each frequency by performing Fast Fourier Transform (FFT) for the vibration signal input to the data storing unit;

a detection frequency integrating unit for integrating amplitudes of frequencies with discrimination selected by a detection frequency selecting unit;

a noise determining unit for determining whether the vibration signal of the knocking sensor is the vibration signal irrelevant to damage to the bearing by determining whether an exclusion frequency for detecting knocking selected by an exclusion frequency selecting unit corresponds to a preset condition; and a damage determining unit for confirming that the bearing is damaged by increasing a damage counter, when the vibration signal of the knocking sensor is the vibration signal due to the damage to the bearing, and a detection frequency integration value obtained by integrating the amplitudes of the detection frequencies is greater than a preset damage threshold, and wherein the noise determining unit determines the vibration signal of the knocking sensor being the vibration signal due to the damage to the bearing, when a value obtained by summing all amplitudes of the exclusion frequencies does not exceed a preset reference, when an exclusion frequency with the largest amplitude among the exclusion frequencies is not within a predetermined ranking among all frequencies, and when a ratio between an exclusion frequency with the largest amplitude among the exclusion frequencies and the detection frequency does not exceed a predetermined ratio.

2. The system of claim 1, wherein the frequency amplitude calculating unit calculates an amplitude for each predetermined frequency interval by performing Fast Fourier Transform (FFT) for the vibration signal stored in the data storing unit.

3. The system of claim 1, wherein the noise determining unit determines the vibration signal of the knocking sensor as the vibration signal irrelevant to the damage to the bearing, when a value obtained by summing all amplitudes of the exclusion frequencies exceeds a preset reference.

4. The system of claim 1, wherein the noise determining unit determines the vibration signal of the knocking sensor as the vibration signal irrelevant to the damage to the bearing, when an exclusion frequency with the largest amplitude among the exclusion frequencies is within a predetermined ranking among all frequencies.

5. The system of claim 1, wherein the noise determining unit determines the vibration signal of the knocking sensor as the vibration signal irrelevant to the damage to the bearing, when a ratio of an exclusion frequency with the largest amplitude among the exclusion frequencies and the detection frequency exceeds a predetermined ratio.

6. The system of claim 1, wherein the damage determining unit increases the damage counter, when the detection frequency integration value is greater than the damage threshold, and confirms that the bearing is damaged, when the damage counter is greater than or equal to a preset confirmation counter, which confirms that the bearing is damaged.

7. The system of claim 6, wherein the damage determining unit sets the damage threshold, the damage counter, and the preset confirmation counter for each operation mode of the engine.

8. The system of claim 7, wherein the damage determining unit confirms the damage to the bearing by being divided into a case where combustion is constantly performed and a case where the combustion is not constantly performed in the engine.

9. The system of claim 8, wherein the damage determining unit confirms the damage to the bearing by being divided into a case where the engine is traveled in a general traveling mode comprising a full load, a part load, and an idle, and a case where the engine is traveled by comprising the entry into a fuel cut, just before the fuel cut, just after the fuel cut, or a tip out.

10. The system of claim 1, further comprising: a limp home control unit for restricting an RPM of the engine to a preset safety RPM or less such that the engine is operated at the preset safety RPM or less, when the damage determining unit confirms the damage to the bearing.

11. A method for detecting damage to a bearing of an engine using a knocking sensor, the method comprising:

a data storing step, which stores a vibration signal output from a knocking sensor installed in an engine in a data storing unit;

a by-frequency amplitude calculating step, which performs, by a frequency amplitude calculating unit, Fast Fourier Transform (FFT) for the vibration signal input to the data storing unit and calculates an amplitude for each frequency;

a detection frequency integrating step, which obtains a detection frequency integration value by adding all amplitudes of detection frequencies selected by a detection frequency selecting unit;

a noise determining step, which determines, by a noise determining unit, whether the vibration signal of the knocking sensor is the vibration signal irrelevant to damage to a bearing by determining whether exclusion frequencies for detecting knockout selected by an exclusion frequency selecting unit correspond to a preset condition;

a counter increasing step, which increases a damage counter, when the detection frequency integration value is greater than a preset damage threshold, if the vibration signal of the knocking sensor is the vibration signal due to the damage to the bearing; and a damage confirming step, which confirms that the bearing is damaged, when the damage counter is greater than or equal to a preset confirmation counter;

wherein the noise determining step determines the vibration signal of knocking sensor as the vibration signal due to the damage to the bearing, when a value obtained by summing all amplitudes of the exclusion frequencies does not exceed a preset reference, when an exclusion frequency with the largest amplitude among the exclusion frequencies is not within a predetermined ranking among al frequencies, and when a ratio between an exclusion frequency with the largest amplitude among the exclusion frequencies and the detection frequency does not exceed a predetermined ratio.

12. The method of claim 11, wherein the data storing step stores a converted vibration signal in the data storing unit by converting the vibration signal output from the knocking sensor into a digital signal in a state where a measurement window is open.

13. The method of claim 11, wherein the by-frequency amplitude calculating step calculates an amplitude for each predetermined frequency interval by performing Fast Fourier Transform (FFT) for the vibration signal stored in the data storing unit.

14. The method of claim 11, wherein the noise determining step determines the vibration signal of the knocking sensor as the vibration signal irrelevant to the damage to the bearing, when a value obtained by summing all amplitudes of the exclusion frequencies exceeds a preset reference.

15. The method of claim 11, wherein the noise determining step determines the vibration signal of the knocking sensor as the vibration signal irrelevant to the damage to the bearing, when an exclusion frequency with the largest amplitude among the exclusion frequencies is within a predetermined ranking among all frequencies.

16. The method of claim 11, wherein the noise determining step determines the vibration signal of the knocking sensor as the vibration signal irrelevant to the damage to the bearing, when a ratio of the exclusion frequency with the largest amplitude among the exclusion frequencies and the detection frequency exceeds a predetermined ratio.

17. The method of claim 11, wherein when the noise determining step determines that the vibration signal detected by the knocking sensor is likely relevant to the damage to the bearing, an operation mode determining step, which determines whether an operation mode of the engine is currently a general traveling mode in which combustion is constantly performed in the engine, is performed.

18. The method of claim 17, wherein between the operation mode determining step and the counter increasing step, an integration value applying step, which sets the detection frequency integration value as a comparison target, and an integration value comparing step, which compares the integration value with the damage threshold, are performed.

19. The method of claim 18, wherein when the operation mode determining step determines the operation mode as the general traveling mode, the integration value applying step uses the detection frequency integration value as a reference value,
compares the reference value with a first damage threshold set for detecting the damage to the bearing upon traveling in the general traveling mode, and
increases a first damage counter, when the reference value exceeds the first damage threshold.

20. The method of claim 19, wherein the operation mode determining step comprises: a state where the engine is operated in any one of a full load, a part load, and an idle.

21. The method of claim 18,
wherein when the operation mode determining step determines that the operation mode is not the general traveling mode because combustion is not constantly performed in the engine,
the integration value applying step uses the detection frequency integration value as an instance value,
compares the instance value with a second damage threshold set for detecting the damage to the bearing if the operation mode is not the general traveling mode, and
increases a second damage counter, when the instance value exceeds the second damage threshold.

22. The method of claim 21, wherein the operation mode determining step comprises: operating the engine in a state of the entry into a fuel cut, just before the fuel cut, just after the fuel cut, or a tip out.

23. The method of claim 11, wherein the damage counter is set to increase for each operation mode of the engine.

24. The method of claim 11, wherein after the damage confirming step, a limp home control step, which controls the engine in a limp home mode which controls the engine by restricting an RPM of the engine to a preset safety RPM or less, is performed.

25. The method of claim 13, further comprising:
a noise confirming step, which confirms the vibration signal of the knocking sensor as the vibration signal irrelevant to the damage to the bearing, when the exclusion frequencies selected by the exclusion frequency selecting unit satisfy the preset condition in the noise determining step, and after the noise determining step, an engine operation determining step, which returns the method to the data storing step when the engine is being operated, and terminates the method when the engine is not being operated by determining whether the engine is operated.

* * * * *